(12) United States Patent
Maeda et al.

(10) Patent No.: US 8,787,374 B2
(45) Date of Patent: Jul. 22, 2014

(54) NETWORK SYSTEM INCLUDING LOWER AND UPPER SWITCHES AND LINK GROUP INTERCONNECTING LOWER SWITCHES TO UPPER SWITCHES, AND METHOD OF OPERATING THE SAME

(75) Inventors: Kazuhiro Maeda, Matsudo (JP); Shingo Sugawara, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 73 days.

(21) Appl. No.: 13/449,196

(22) Filed: Apr. 17, 2012

(65) Prior Publication Data

US 2012/0300773 A1 Nov. 29, 2012

(30) Foreign Application Priority Data

May 27, 2011 (JP) .................................. 2011-118796

(51) Int. Cl.
*H04L 12/28* (2006.01)
*H04L 12/50* (2006.01)

(52) U.S. Cl.
USPC .......................................... 370/390; 370/357

(58) Field of Classification Search
USPC .......................................................... 370/390
See application file for complete search history.

(56) References Cited

U.S. PATENT DOCUMENTS

| | | | | |
|---|---|---|---|---|
| 6,058,116 | A * | 5/2000 | Hiscock et al. ................ | 370/401 |
| 6,195,349 | B1 | 2/2001 | Hiscock et al. | |
| 7,139,267 | B2 * | 11/2006 | Lu et al. ........................ | 370/386 |
| 7,840,136 | B1 * | 11/2010 | Cunningham et al. .......... | 398/45 |
| 7,843,907 | B1 * | 11/2010 | Abou-Emara et al. ........ | 370/386 |
| 8,396,067 | B2 * | 3/2013 | Miyoshi et al. ............... | 370/392 |
| 2003/0128706 | A1 * | 7/2003 | Mark et al. ................... | 370/395.1 |
| 2005/0031097 | A1 * | 2/2005 | Rabenko et al. ............. | 379/93.31 |
| 2010/0284416 | A1 * | 11/2010 | Aoshima ...................... | 370/401 |
| 2010/0303083 | A1 * | 12/2010 | Belanger et al. ............... | 370/401 |
| 2010/0316053 | A1 | 12/2010 | Miyoshi et al. | |
| 2011/0019679 | A1 * | 1/2011 | Akahane et al. .............. | 370/401 |
| 2011/0271007 | A1 * | 11/2011 | Wang et al. .................. | 709/238 |
| 2012/0033549 | A1 * | 2/2012 | Joshi et al. .................... | 370/228 |
| 2012/0033668 | A1 * | 2/2012 | Humphries .................... | 370/390 |

FOREIGN PATENT DOCUMENTS

| | | |
|---|---|---|
| JP | 2009-290271 A | 12/2009 |
| JP | 2010-288168 A | 12/2010 |

* cited by examiner

*Primary Examiner* — Gerald Smarth
(74) *Attorney, Agent, or Firm* — McGinn IP Law Group, PLLC

(57) ABSTRACT

A network system includes a plurality of lower switches, a plurality of upper switches, and a link group for interconnecting the plurality of lower switches to the plurality of upper switches in a multipoint-to-multipoint relationship. The link group includes a sub-link for interconnecting the plurality of lower switches to the plurality of upper switches in a point-to-point relationship as one logical link and a main link for interconnecting the plurality of lower switches to the plurality of upper switches in a point-to-multipoint relationship as one logical link. The plurality of lower switches are each set such that a broadcast frame with a broadcast address set as a destination is transmitted to the plurality of upper switches through the sub-link. The plurality of upper switches each receive the broadcast frame and resister a source address contained in the broadcast frame into an FDB of the plurality of upper switches.

12 Claims, 11 Drawing Sheets

FIG.5

| LAG ID | N-PORT |
|---|---|
| LAG 46a | N-PORT 38a |
| | N-PORT 38b |
| | N-PORT 38c |
| | N-PORT 38d |
| | N-PORT 38e |
| | N-PORT 38f |

| PORT NUMBER | CONNECTED UPPER SWITCH | BROADCAST TRANSMISSION ACCEPTANCE | BROADCAST RECEPTION ACCEPTANCE |
|---|---|---|---|
| #1 | UPPER SWITCH 20a | ACCEPTED | ACCEPTED |
| #2 | UPPER SWITCH 20a | REFUSED | ACCEPTED |
| #3 | UPPER SWITCH 20a | REFUSED | ACCEPTED |
| #4 | UPPER SWITCH 20b | ACCEPTED | REFUSED |
| #5 | UPPER SWITCH 20b | REFUSED | REFUSED |
| #6 | UPPER SWITCH 20b | REFUSED | REFUSED |

| PORT NUMBER | CONNECTED UPPER SWITCH | BROADCAST TRANSMISSION ACCEPTANCE | BROADCAST RECEPTION ACCEPTANCE |
|---|---|---|---|
| #1 | UPPER SWITCH 20a | REFUSED | ACCEPTED |
| #2 | UPPER SWITCH 20a | ACCEPTED | ACCEPTED |
| #3 | UPPER SWITCH 20a | REFUSED | ACCEPTED |
| #4 | UPPER SWITCH 20b | ACCEPTED | REFUSED |
| #5 | UPPER SWITCH 20b | REFUSED | REFUSED |
| #6 | UPPER SWITCH 20b | REFUSED | REFUSED |

| PORT NUMBER | CONNECTED UPPER SWITCH | BROADCAST TRANSMISSION ACCEPTANCE | BROADCAST RECEPTION ACCEPTANCE |
|---|---|---|---|
| #1 | UPPER SWITCH 20a | REFUSED | REFUSED |
| #2 | UPPER SWITCH 20a | REFUSED | REFUSED |
| #3 | UPPER SWITCH 20a | REFUSED | REFUSED |
| #4 | UPPER SWITCH 20b | ACCEPTED | ACCEPTED |
| #5 | UPPER SWITCH 20b | REFUSED | ACCEPTED |
| #6 | UPPER SWITCH 20b | REFUSED | ACCEPTED |

42c

NETWORK SYSTEM INCLUDING LOWER AND UPPER SWITCHES AND LINK GROUP INTERCONNECTING LOWER SWITCHES TO UPPER SWITCHES, AND METHOD OF OPERATING THE SAME

The present application is based on Japanese patent application No. 2011-118796 filed on May 27, 2011 the entire contents of which are incorporated herein by reference.

BACKGROUND OF THE INVENTION

1. Field of the Invention

The invention relates to a network system and a method of operating the same.

2. Description of the Related Art

For connecting multiple terminal units, a network system to which a network topology such as FAT-Tree is applied is known (see, e.g., JP-A-2010-288168). This network system has a multi-stage structure consisting of two stages, lower and upper layers. The lower layer consists of plural leaf switches (lower switches) connected to terminal units and the upper layer consists of plural route switches (upper switches) each connected to all the leaf switches.

In the multistage network system, frames are transmitted and received between the lower switches via the upper switches.

SUMMARY OF THE INVENTION

In the multistage network system, an LAG (link aggregation group) is configured in the lower switch to logically bundle plural ports connected to different upper switches into one port. Each lower switch distributes the received frames to plural ports belonging to the LAG and then transmits to the upper switches. Accordingly, transmission and reception of frames between the lower switches are shared among the plural upper switches.

However, when the LAG is configured in the lower switch, there is a problem that a source address contained in a broadcast frame cannot be simultaneously registered to an FDB (forwarding database) in the plural upper switches.

For transferring an ARP request frame which is used for checking a MAC address of a destination device, each lower switch transmits the ARP request frame from any one of ports belonging to the LAG.

In this case, any one of the plural upper switches can receive the ARP request frame and other upper switches cannot receive the ARP request frame. Therefore, a source address of the ARP request frame can be registered in the FDB of the upper switch which received the ARP request frame but cannot be registered in the FDB of upper switches which do not receive the ARP request frame.

This problem occurs also in case of transferring an RARP request frame which is used for checking an IP address of the destination device.

Accordingly, it is an object of the invention to provide a network system that allows a source address contained in a broadcast frame to be simultaneously registered into the FDB of plural upper switches, and a method of operating the network system.

(1) According to one embodiment of the invention, a network system comprises:
 a plurality of lower switches;
 a plurality of upper switches; and
 a link group for interconnecting the plurality of lower switches to the plurality of upper switches in a multipoint-to-multipoint relationship,
 wherein the link group comprises a sub-link for interconnecting the plurality of lower switches to the plurality of upper switches in a point-to-point relationship as one logical link and a main link for interconnecting the plurality of lower switches to the plurality of upper switches in a point-to-multipoint relationship as one logical link,
 wherein the plurality of lower switches are each set to conduct a broadcast transmission such that a broadcast frame with a broadcast address set as a destination is transmitted to the plurality of upper switches through the sub-link that is available for communication and connected to the plurality of lower switches, and
 wherein the plurality of upper switches each receive the broadcast frame and resister a source address contained in the broadcast frame into an FDB of the plurality of upper switches.

In the above embodiment (1) of the invention, the following modifications and changes can be made.

(i) The broadcast transmission is set such that the plurality of lower switches each transmit the broadcast frame through one physical link per each of the sub-link when the sub-link comprises two or more physical links.

(ii) When the broadcast frame through the one physical link is not transmitted, the broadcast transmission is set such that the plurality of lower switches each transmit the broadcast frame through another physical link belonging to the same sub-link as the one physical link.

(iii) A broadcast reception is set such the plurality of lower switches each receive only a broadcast frame relayed by one designated switch selected from the plurality of upper switches.

(iv) When the designated switch has a malfunction, a new designated switch is selected from the plurality of upper switches.

(v) The broadcast reception is set such that the plurality of lower switches each refuse reception of a broadcast frame relayed by the plurality of upper switches except the designated switch.

(vi) The broadcast frame comprises an ARP request frame or an RARP request frame.

(2) According to another embodiment of the invention, a method of operating a network system that comprises a plurality of lower switches, a plurality of upper switches and a link group for interconnecting the plurality of lower switches to the plurality of upper switches in a multipoint-to-multipoint relationship, the link group comprising a sub-link for interconnecting the plurality of lower switches to the plurality of upper switches in a point-to-point relationship as one logical link and a main link for interconnecting the plurality of lower switches to the plurality of upper switches in a point-to-multipoint relationship as one logical link, comprises:
 transmitting a broadcast frame with a broadcast address set as a destination from each of the plurality of lower switches to the plurality of upper switches through the sub-link that is available for communication and connected to the plurality of lower switches; and
 receiving the broadcast frame by each of the plurality of upper switches and registering a source address contained in the broadcast frame into an FDB of each of the plurality of upper switches.

Points of the Invention

According to one embodiment of the invention, a network system is constructed such that a lower switch transmits an ARP request frame to all of upper switches even if a network port thereof belongs to an LAG. Thereby, a source address contained in the ARP request frame can be registered into an FDB in all of the upper switches.

BRIEF DESCRIPTION OF THE DRAWINGS

Next, the present invention will be explained in more detail in conjunction with appended drawings, wherein:

FIG. 5 is a table showing a content of an LAG table created in a memory unit of the lower switch shown in FIG. 4;

FIG. 6 is a table showing a content of a broadcast table configured by a transmission setting section and a reception setting section of the lower switch shown in FIG. 4;

FIG. 11 is a table showing a content of the broadcast table of the lower switch after occurrence of the link failure, which is used for transferring the ARP request frame shown in FIG. 10;

FIG. 13 is a table showing a content of the broadcast table after detecting the equipment failure, which is used for transferring the ARP request frame shown in FIG. 12.

DETAILED DESCRIPTION OF THE PREFERRED EMBODIMENTS

An embodiment of the invention will be described below in conjunction with the drawings.

Figure 1:
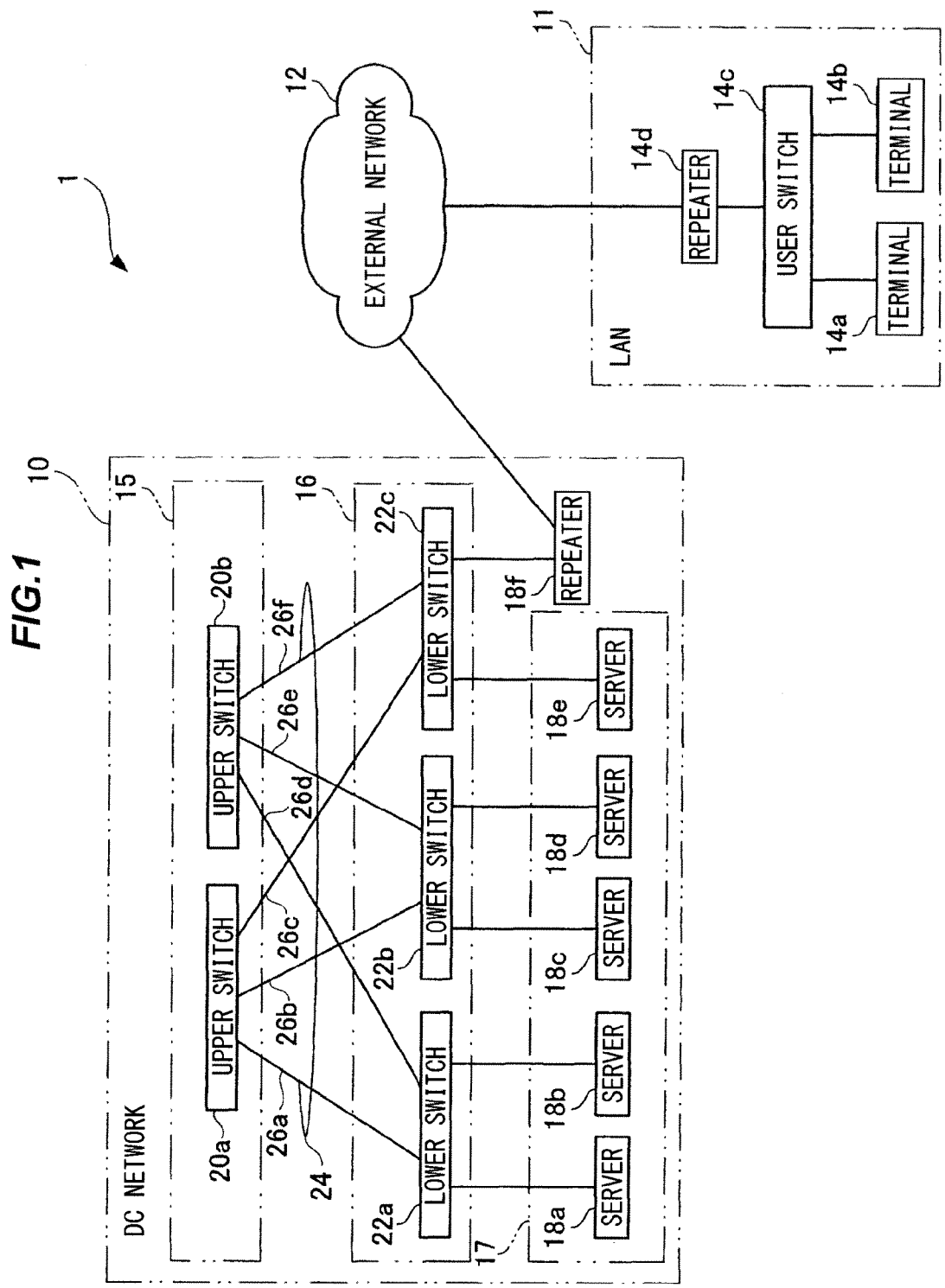
FIG. 1 is a schematic diagram showing a configuration example of a network using a network system in an embodiment.

FIG. 1 is a schematic diagram showing a configuration example of a network 1 using a network system 10 in the present embodiment.

The network 1 used by users is composed of a DC (data center) network 10 as the network system 10, a LAN (local area network) 11 and an external network 12.

The LAN 11 is installed in, e.g., business establishments, and includes terminals 14a and 14b operated by users, a user switch 14c and a repeater 14d, etc.

The terminals 14a and 14b are connected to the external network 12 via the user switch 14c and the repeater 14d.

The external network 12 is a wide area network or an internet network, etc., which is provided by telecommunications carriers, etc. The external network 12 connects the repeater 14d of the LAN 11 to the DC network 10.

DC Network

The DC network 10 is configured in multiple stages consisting of an upper switch group 15, a lower switch group 16 and a server group 17.

The server group 17 consists of plural servers 18a, 18b, 18c, 18d and 18e which are file or mail servers, etc. The servers 18a, 18b, 18c, 18d and 18e are connected to the lower switch group 16. In addition, the DC network 10 includes a repeater 18f which connects the lower switch group 16 to the external network 12.

The servers 18a, 18b, 18c, 18d and 18e can process data in response to requests from the terminals 14a and 14b through the external network 12, etc. In addition to this, the servers 18a, 18b, 18c, 18d and 18e can process data while linking up with each other in the DC network 10.

The upper switch group 15 consists of upper switches 20a and 20b.

The lower switch group 16 consists of lower switches 22a, 22b and 22c.

It should be noted that the numbers of upper switches in the upper switch group 15, of lower switches in the lower switch group 16 and of servers in the server group 17 are not limited to what are shown in FIG. 1. Hereinafter, "the upper switches 20a and 20b", "the lower switches 22a, 22b and 22c" and "the servers 18a, 18b, 18c, 18d and 18e" are also appropriately referred to as "upper switch(es) 20", "lower switch(es) 22" and "server(s) 18".

The upper switches 20 and the lower switches 22 are interconnected by a link group 24 consisting of plural transmission media. The link group 24 interconnects the lower switches 22 to the upper switches 20 in a multipoint-to-multipoint relationship, three-to-two interconnection in the present embodiment, so that each of the upper switches 20 can relay a frame between the lower switches 22. The link group 24 connects each of the lower switches 22 to all of the upper switches 20.

The link group 24 includes plural sub-links 26a, 26b, 26c, 26d, 26e and 26f. Each of the sub-links 26a, 26b, 26c, 26d, 26e and 26f interconnects the upper switch 20 to the lower switch 22 in a point-to-point relationship.

Accordingly, for example, the lower switch 22a is connected to the plural upper switches 20a and 20b by the plural sub-links 26a and 26d. Hereinafter, "the sub-links 26a, 26b, 26c, 26d, 26e and 26f" are also referred to as "sub-link(s) 26".

Configuration of Upper Switch

Figure 2:
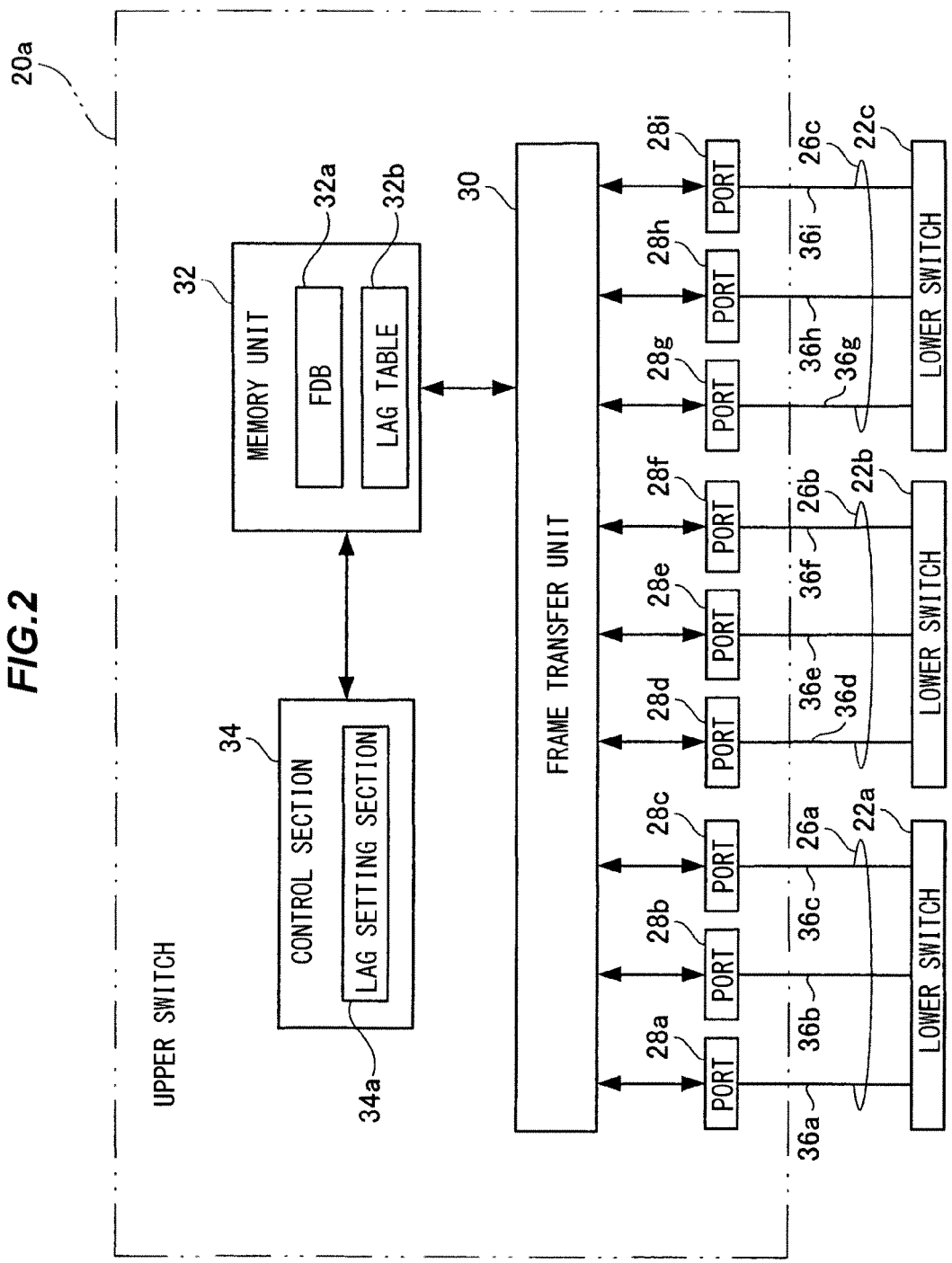
FIG. 2 is a schematic block diagram showing a functional configuration of an upper switch shown in FIG. 1.

FIG. 2 is a schematic block diagram showing a functional configuration of the upper switch 20a shown in FIG. 1. Solid arrows shown in FIG. 2 indicate a transfer direction of frame and signal. Note that, a functional configuration of the upper switch 20b shown in FIG. 1 is the same as that of the upper switch 20a and the explanation for the upper switch 20b is omitted.

The upper switch 20a is, e.g., a switching hub with a data transfer function in Layer 2 of an OSI (open systems interconnection) reference model, and where appropriate, with a data transfer function in Layer 3, etc. In the present embodiment, the upper switch 20a is a box-type.

The upper switch 20a has plural ports 28a, 28b, 28c, 28d, 28e, 28f, 28g, 28h and 28i, a frame transfer unit 30, a memory unit 32 and a control section 34. The memory unit 32 includes an FDB (forwarding database) 32a and an LAG (link aggregation group) table 32b. Meanwhile, the control section 34 includes a LAG setting section 34a.

The ports 28a, 28b and 28c are connected to the lower switch 22a via network cables 36a, 36b and 36c which are transmission media. The ports 28d, 28e and 28f are connected to the lower switch 22b via network cables 36d, 36e and 36f.

The ports 28g, 28h and 28i are connected to the lower switch 22c via network cables 36g, 36h and 36i.

Hereinafter, "the ports 28a, 28b, 28c, 28d, 28e, 28f, 28g, 28h and 28i" are also referred to as "port(s) 28" and "the network cables 36a, 36b, 36c, 36d, 36e, 36f, 36g, 36h and 36i" are also referred to as "network cable(s) 36". The number of the ports 28 is not limited to what is shown in the drawing.

The port 28 transfers the frame received from the lower switch 22 to the frame transfer unit 30, and also transmits the frame transferred from the frame transfer unit 30 to the connected lower switch 22.

The frame transfer unit 30 transfers the frame transferred from a port 28 to a port 28 as a transfer destination based on the destination address contained in the frame by reference to the FDB 32a and the LAG table 32b. In addition, the frame transfer unit 30 registers the source address contained in the frame to the FDB 32a so as to be associated with the port number of the port 28 which received the frame or with identification information of the LAG. The frame transfer unit 30 is implemented by, e.g., an integrated circuit such as FPGA (field programmable gate array) or ASIC (application specific integrated circuit), etc.

The memory unit 32 is, e.g., a recording medium such as (random access memory) which is a volatile rewritable memory.

The FDB 32a is a database for frame transfer. In the FDB 32a, the source address of the received frame and the port number of the port 28 which received the frame are stored so as to be associated with each other. In addition, in case that the LAG is configured, the identification information for identifying the LAG is stored instead of the port number of the port 28 so as to be associated with the source address.

The control section 34 is implemented by, e.g., a CPU (central processing unit). The LAG setting section 34a configures the LAG based on, e.g., command from an administrator of the DC network 10. The LAG is configured by the LAG setting section 34a and the LAG table 32b is created in the memory unit 32. In the LAG table 32b, the identification information of the LAG and the port numbers of the ports 28 belonging to the LAG are stored so as to be associated with each other.

As shown in FIG. 2, the upper switch 20a is connected to each lower switch 22 in a point-to-point relationship via three physical links which are three network cables 36. The LAG setting section 34a configures the LAG so that the three physical links are logically bundled into a link, i.e., into a sub-link 26.

Each of the sub-links 26a, 26b and 26c which interconnect the upper switch 20a to the lower switches 22 includes three network cables 36 which form a LAG. Therefore, the sub-link 26 is also called a LAG 26.

Figure 3:
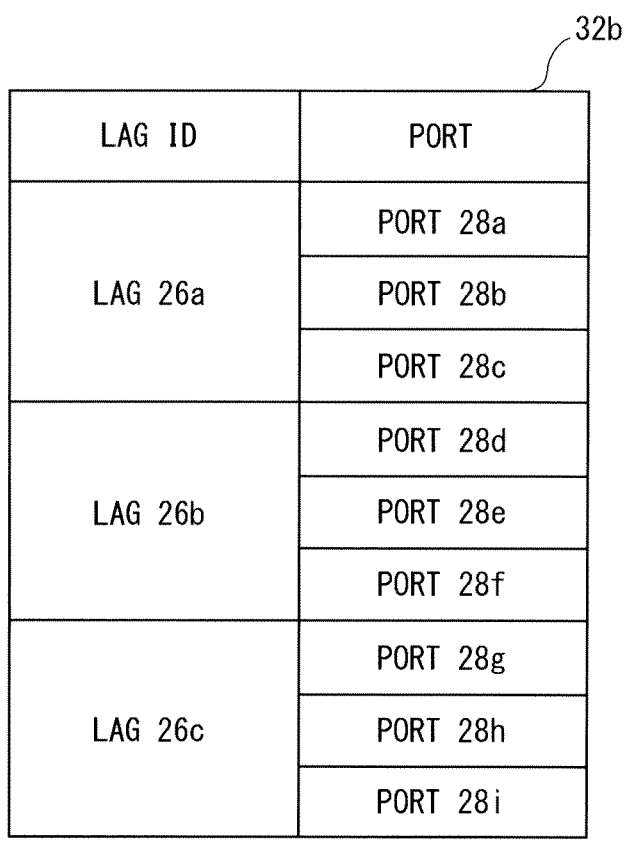
FIG. 3 is a table showing a content of an LAG table created in a memory unit of the upper switch shown in FIG. 2.

FIG. 3 shows an example of the LAG table 32b which is created in the memory unit 32. In the LAG table 32b, the ports 28a, 28b and 28c are assigned to the sub-link 26a, and the ports 28d, 28e and 28f are assigned to the sub-link 26b. In addition, the ports 28g, 28h and 28i are assigned to the sub-link 26c in the LAG table 32b.

For transferring plural frames from, e.g., the upper switch 20a to the lower switch 22a, the frame transfer unit 30 distributes and transmits the frames to the ports 28a, 28b and 28c which belong to the sub-link 26a. Note that, the sub-link 26 should include one or more network cables 36, i.e., one or more physical links.

Configuration of Lower Switch

Figure 4:
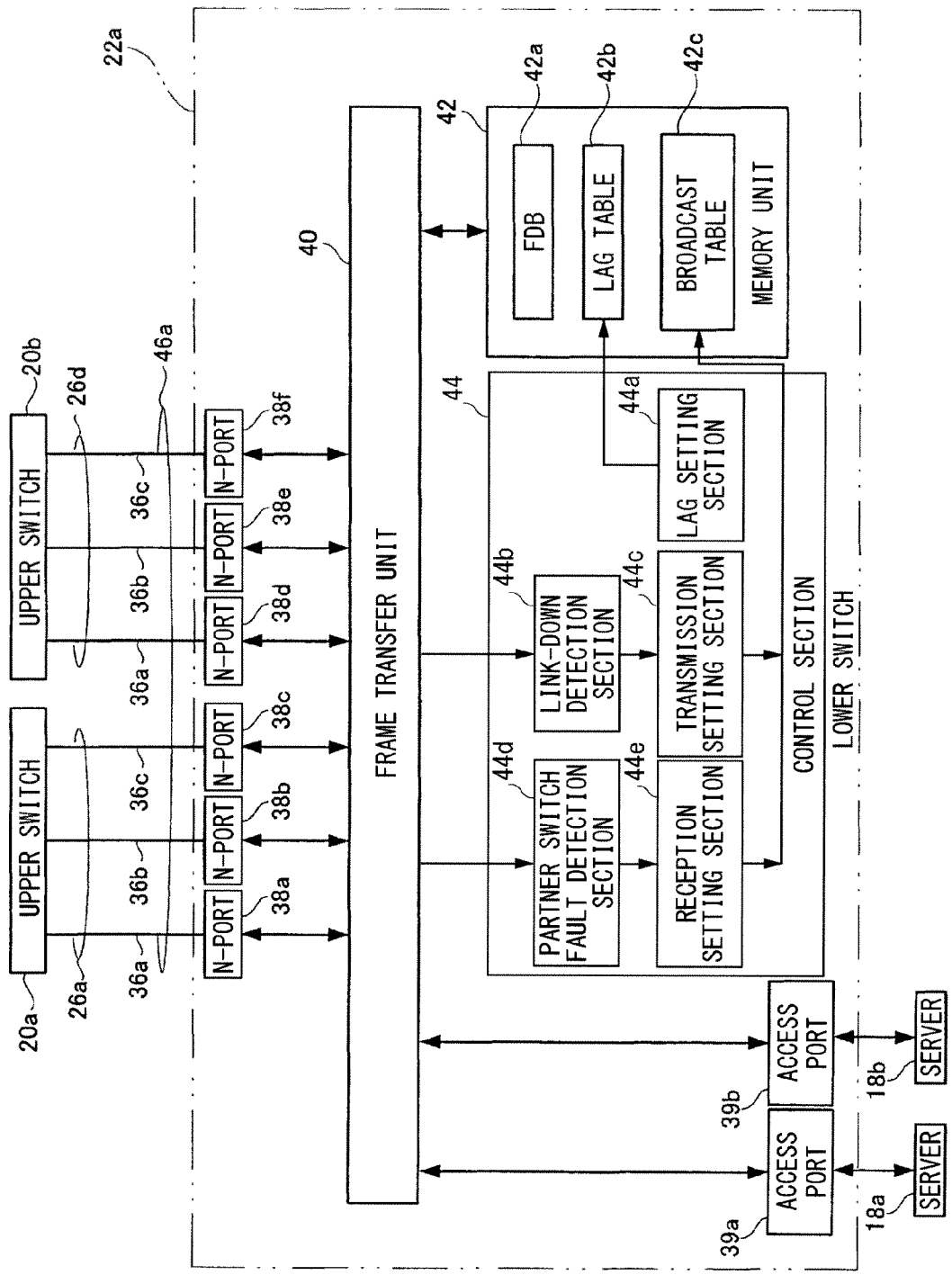
FIG. 4 is a schematic block diagram showing a functional configuration of a lower switch interconnected to the upper switch shown in FIG. 2.

FIG. 4 is a schematic block diagram showing a functional configuration of the lower switch 22a interconnected to the upper switches 20. Solid arrows shown in FIG. 4 indicate a transfer direction of frame and signal. Note that, a functional configuration of the lower switches 22b and 22c shown in FIG. 1 is the same as that of the lower switch 22a and the explanation for the lower switches 22b and 22c is omitted.

Similarly to the upper switch 20, the lower switch 22a is, e.g., a switching hub with a data transfer function in Layer 2 of an OSI reference model, and where appropriate, with a data transfer function in Layer 3, etc. In the present embodiment, the lower switch 22a is a box-type.

The lower switch 22a has plural network ports (N-ports) 38a, 38b, 38c, 38d, 38e and 38f, access ports 39a and 39b, a frame transfer unit 40, a memory unit 42 and a control section 44. The memory unit 42 includes an FDB 42a, an LAG table 42b and a broadcast table 42c.

In the lower switch 22a, the network ports 38a, 38b and 38c are connected to the upper switch 20a via the network cables 36a, 36b and 36c. Meanwhile, the network ports 38d, 38e and 38f are connected to the upper switch 20b via the network cables 36a, 36b and 36c. In addition, the access ports 39a and 39b are respectively interconnected to the servers 18a and 18b.

Hereinafter, "the network ports 38a, 38b, 38c, 38d, 38e and 38f" are also referred to as "network port(s) 38". In addition, "the access ports 39a and 39b" are also referred to as "access port(s) 39".

The numbers of the network ports 38 and of the access ports 39 are not limited to what are shown in the drawing.

The lower switch 22a and the all of the upper switches 20 are interconnected in a point-to-multipoint relationship, one-to-two interconnection in the present embodiment, via a main link 46a including physical links which are the network cables 36

Similarly to the frame transfer unit 30 of the upper switch 20, the frame transfer unit 40 is implemented by an ASIC or FPGA. Based on the destination address contained in the frame, the frame transfer unit 40 transfers the frame to the network ports 38 or the access ports 39a and 39b as a transfer destination. For transferring a unicast frame that the destination address is set to be a specific MAC address, the frame transfer unit 40 transfers the frame by reference to the FDB 42a and the LAG table 42b.

When a broadcast frame that the destination address is set to be broadcast is transferred to the upper switch 20, the frame transfer unit 40 transfers the frame by reference to the broadcast table 42c. In addition, the frame transfer unit 40 registers the source address contained in the frame to the FDB 42a so as to be associated with the port number of the network port 38 or access port 39 which received the frame or with the identification information of the LAG.

Similarly to the memory unit 32 of the upper switch 20, the memory unit 42 is implemented by a recording medium such as RAM.

The FDB 42a is a database for frame transfer. Meanwhile, the LAG table 42b is a database for the LAG.

The control section 44 has a LAG setting section 44a, a link-down detection section 44b, a transmission setting section 44c, a partner switch fault detection section 44d and a reception setting section 44e. Similarly to the control section 34 of the upper switch 20, the control section 44 is implemented by, e.g., a CUP.

As shown in FIG. 4, the lower switch 22a is connected to each of the upper switches 20 in a point-to-point relationship each via three physical links which are three network cables 36.

The LAG setting section 44a configures the LAG based on, e.g., command from an administrator of the DC network 10. In the LAG configured by the LAG setting section 44a, all physical links connected to all of the upper switches 20 are logically bundled into a link, e.g., into the main link 46a.

The main link 46a which interconnects the lower switch 22a to all of the upper switches 20 includes all physical links connected to each of the upper switches 20, which form a LAG. Therefore, the main link 46a is also called a LAG 46a.

When the LAG 46a is configured by the LAG setting section 44a, the LAG table 42b is created in the memory unit 42. FIG. 5 shows an example of the LAG table 42b created in the memory unit 42. In the LAG table 42b shown in FIG. 5, the network ports 38a, 38b, 38c, 38d, 38e and 38f are assigned to the LAG 46a.

When the lower switch 22a transmits a unicast frame to the upper switch 20, the frame transfer unit 40 transmits the unicast frame via any of the network ports 38a, 38b, 38c, 38d, 38e and 38f belonging to the LAG 46a by reference to the LAG table 42b.

At this time, the frame transfer unit 40 can calculate hash value based on the destination or source address contained in the frame and distribute the unicast frame to the network ports 38a, 38b, 38c, 38d, 38e and 38f based on the hash value.

The link-down detection section 44b can detect that individual physical links are disconnected (link-down). When, for example, a signal indicating link-down is received from the upper switch 20, the link-down detection section 44b informs about the occurrence of link-down to the LAG setting section 44a.

Alternatively, it may be configured to periodically communicate between the upper switches 20 and the lower switches 22 to confirm bidirectional connection (keep alive communication) so that link-down is detected when the communication is lost.

The partner switch fault detection section 44d can detect a failure occurred in the connected upper switch 20. The partner switch fault detection section 44d informs about the failure occurred in the connected upper switch 20 to the reception setting section 44e when, e.g., electrical or optical signal transmitted from the connected upper switch 20 is lost.

Broadcast Transmission Setting

The transmission setting section 44c and the reception setting section 44e preliminarily create, and updates if necessary, the broadcast table 42c based on, e.g., command from an administrator of the DC network 10. The frame transfer unit 40 transfers the broadcast frame by reference to the broadcast table 42c.

When the broadcast frame that the destination is set to be a broadcast address is received by the access ports 39a or 39b, the frame transfer unit 40 transmits the broadcast frame by reference to the broadcast table 42c through all sub-links 26 available for communication which are included in the LAG 46a. Meanwhile, when the sub-link 26 consists of the plural network cables 36, i.e., plural physical links, the frame transfer unit 40 transmits the broadcast frame through one physical link per each sub-link 26 by reference to the broadcast table 42c.

That is, in the broadcast table 42c, it is configured such that each of the lower switches 22 transmits the broadcast frame to the plural upper switches 20 through all sub-links 26 available for communication which are connected to the lower switches 22 (broadcast transmission setting).

Then, when the sub-link 26 consists of two or more physical links, the broadcast transmission setting is set such that the broadcast frame is transmitted through one physical link per each sub-link 26.

In detail, two sub-links 26 shown in FIG. 4 connecting the lower switch 22a to the upper switches 20a and 20b in a point-to-point relationship each consist of three physical links (network cables 36).

In this case, the transmission setting section 44c selects, e.g., the network port 38a, as a port to transmit the broadcast frame, among the network ports 38a, 38b and 38c constituting the sub-link 26a, and sets the broadcast table 42c accordingly.

In addition, the transmission setting section 44c selects, e.g., the network port 38d, as a port to transmit the broadcast frame, among the network ports 38d, 38e and 38f constituting the sub-link 26b, and sets the broadcast table 42c accordingly.

Broadcast Reception Setting

Meanwhile, the frame transfer unit 40 transfers only the broadcast frame received by the network port 38 which accepts reception of the broadcast frame by reference to the LAG table 42b.

In detail, the reception setting section 44e creates and updates the broadcast table 42c so that the network ports 38 connected to any one of the plural upper switches 20 accept the reception of the broadcast frame while the network ports 38 connected to other upper switch 20 refuse to receive the broadcast frame. In other words, the reception setting section 44e selects the network ports 38 for receiving the broadcast frame sub-link 26 by sub-link 26.

In the present embodiment, the upper switch 20 connected to the network ports 38 allowed to receive the broadcast frame is referred to as "a designated switch". In the broadcast table 42c, it is configured such that the lower switches 22 refuse to receive the broadcast frame relayed by the upper switch 20 other than the designated switch (broadcast reception setting).

Broadcast Table

FIG. 6 is a table showing a content of the broadcast table 42c configured by the transmission setting section 44c and the reception setting section 44e of the lower switch 22a shown in FIG. 4.

The broadcast table 42c consists of four sections, "port number", "connected upper switch", "broadcast transmission acceptance" and "broadcast reception acceptance".

When receiving and then transmitting the broadcast frame, the lower switch 22a transmits the broadcast frame via all of the network ports 38 and the access ports 39 except the port which received the broadcast frame.

Here, in the broadcast table 42c, ports used for transmitting the broadcast frame are determined among the ports logically grouped into one port, i.e., into the LAG 46a.

Likewise, for receiving the broadcast frame, in the broadcast table 42, ports used for receiving the broadcast frame are determined among the ports logically grouped into one port, i.e., into the LAG 46a.

In the "port number" section in the far left column, the port numbers allocated to the network ports 38a, 38b, 38c, 38d, 38e and 38f which belong to the LAG 46a are shown.

In FIG. 6, the port numbers corresponding to the network ports 38a, 38b, 38c, 38d, 38e and 38f are denoted as "#1, #2, #3, #4, #5 and #6". Alternatively, IP addresses or MAC addresses, etc., set for the network ports 38a, 38b, 38c, 38d, 38e and 38f may be allocated in the "port number" section.

In the "connected upper switch" section in the second column from the left, the upper switches 20a and 20b connected to each of the network ports 38 are shown.

In the "connected upper switch" section, it is configured that "the upper switch 20a" is assigned to the port number "#1, #2 and #3" and "the upper switch 20b" is assigned to the port number "#4, #5 and #6". Although component names, such as the upper switches 20a and 20b, are shown here, it may be configured by IP addresses, MAC addresses or host names, etc., set for the upper switches 20a and 20b.

In the "broadcast transmission acceptance" section in the third column from the left, whether or not to allow transmission of the broadcast frame is determined for the port numbers "#1, #2, #3, #4, #5 and #6".

In the "broadcast transmission acceptance" section, "#1 and #4" are set to "accept" and "#2, #3, #5 and #6" are set to "refuse". That is, only one of three network ports 38 per sub-link 26 is allowed to transmit the broadcast frame.

In the "broadcast reception acceptance" section in the far right column, whether or not to allow reception of the broadcast frame is determined for the port numbers "#1, #2, #3, #4, #5 and #6".

In the "broadcast reception acceptance" section, "#1 #2 and #3" are set to "accept". On the other hand, "#4, #5 and #6" are set to "refuse". That is, reception of the broadcast frame is allowed only through one sub-link 26.

Information about the "connected upper switch" does not necessarily need to be included in the broadcast table 42c provided that the connection between the network ports 38 and the connected upper switches 20 is known.

In addition, the broadcast table 42c is not limited to the format with the "port number" section, the "connected upper switch" section, the "broadcast transmission acceptance" section and the "broadcast reception acceptance" section. For example, the broadcast table 42c may be incorporated in the format of the LAG table 42b.

A flow of unicast and broadcast frames transferred in the DC network 10 of the present embodiment will be described in sequence below.

In case of transferring the unicast frame, the lower switch 22a receives the unicast frame via the access ports 39a or 39b and then transfers the received unicast frame to the connected servers 18a or 18b or upper switches 20a or 20b based on the destination address contained in the unicast frame. When the lower switch 22a transmits the unicast frame to the upper switches 20a or 20b, the lower switch 22a distributes and transmits the unicast frame to any one of the network ports 38 belonging to the LAG 46a.

Figure 7:
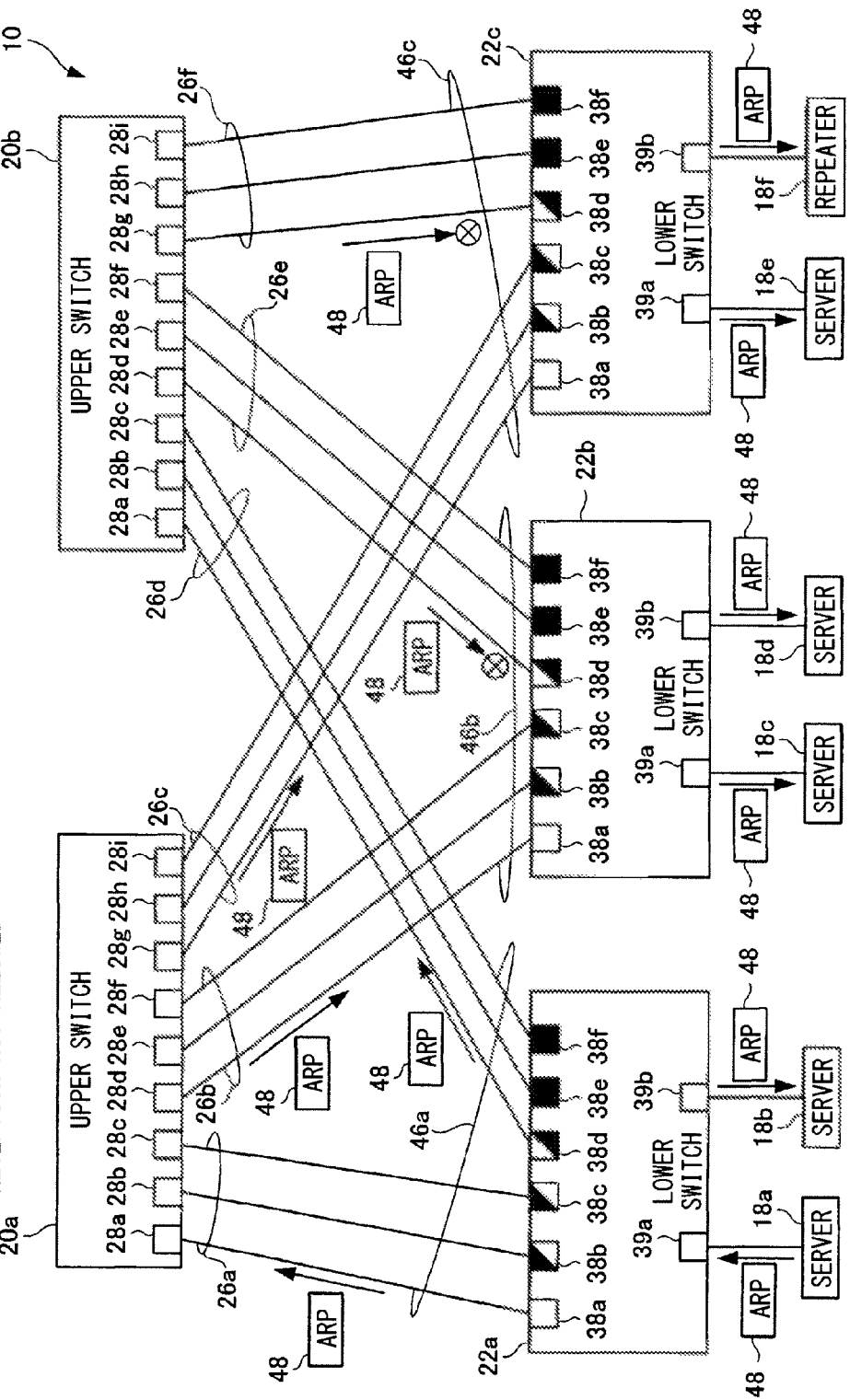
FIG. 7 is a schematic diagram showing a flow of a broadcast frame from the lower switch to a server based on the broadcast table in FIG. 6.

Next, the transfer of the broadcast frame will be described. FIG. 7 is a schematic diagram showing a flow of the broadcast frame transferred from the lower switch 22a to the server 18e based on the broadcast table 42c in FIG. 6. In the explanation of FIG. 7, an ARP (address resolution protocol) request frame 48 is used as an example of the broadcast frame.

Here, the network port 38 indicated by an open square in FIG. 7 is a port which is configured to accept transmission and reception of the broadcast frame. The network ports 38 indicated by a solid black square are ports which are configured to refuse transmission and reception of the broadcast frame. The network port 38 indicated by a square half-filled with black in lower right corner is a port which is configured to accept transmission of and to refuse reception of the broadcast frame. Then, the network ports 38 indicated by a square half-filled with black in upper left corner are ports which are configured to accept reception of and to refuse transmission of the broadcast frame.

Figure 10:
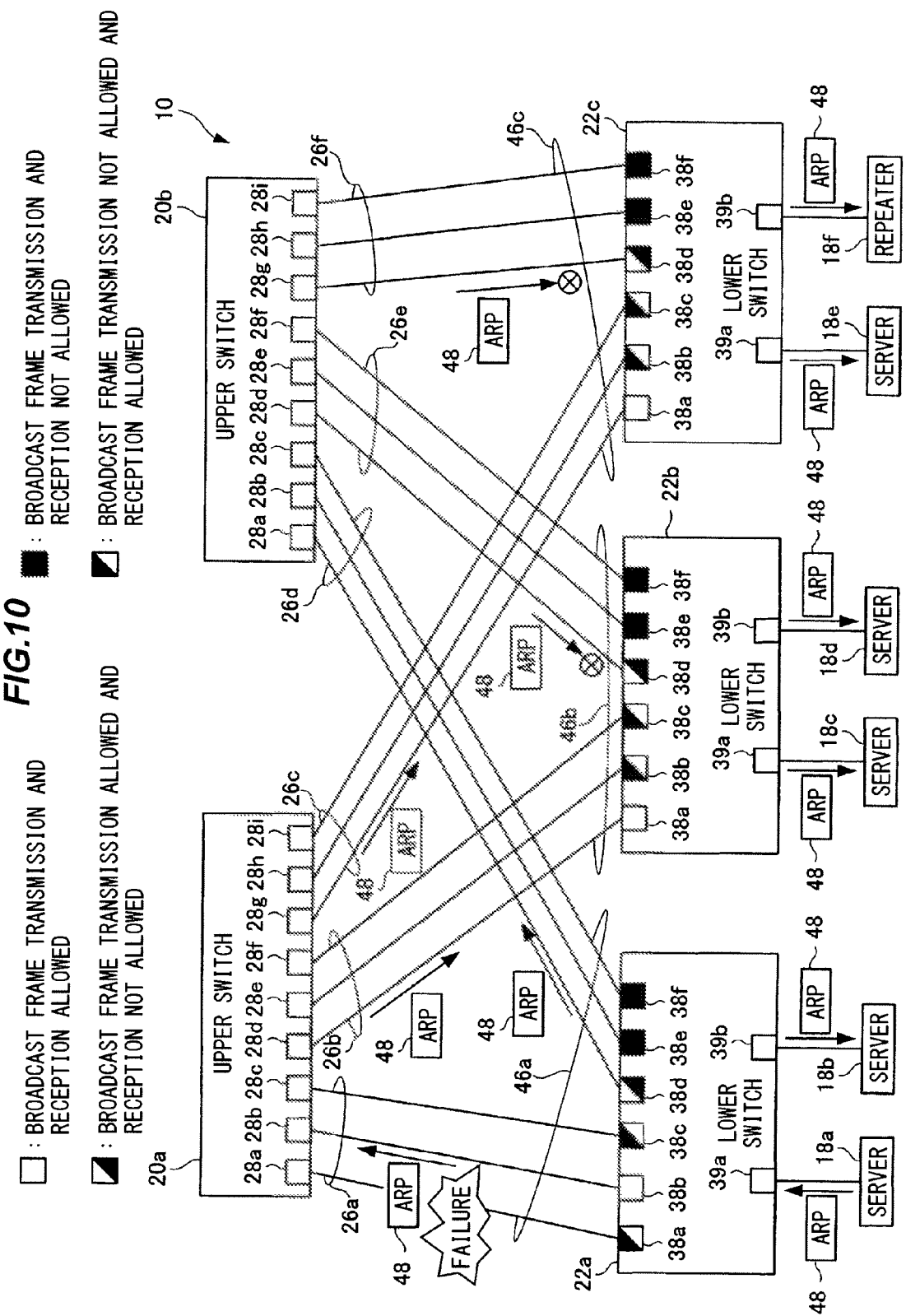
FIG. 10 is a schematic diagram showing a flow of the ARP request frame when a link failure occurs in a DC network shown in FIG. 7.
Figure 12:
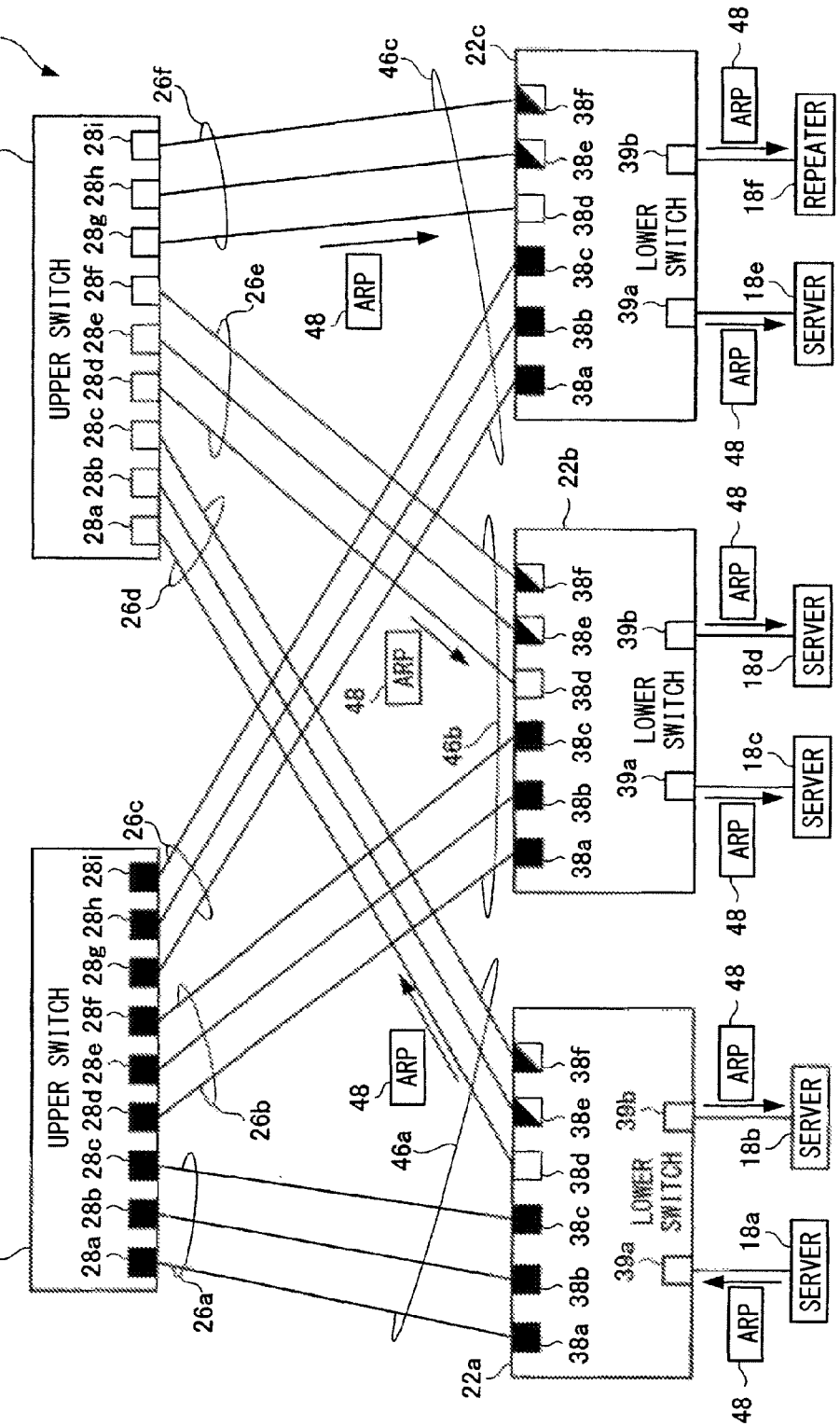
FIG. 12 is a schematic diagram showing a flow of the broadcast frame in the DC network in case a failure occurs in the upper switch shown in FIG. 7.

These symbols indicating the network ports 38 are also used in FIGS. 10 and 12. Note that, the failed ports 28 of the upper switch 20a are also indicated by solid black squares in FIG. 12.

An ARP is a general protocol by which terminals connected to LANs get each other a MAC address set in a terminal as a communicated party based on an IP address set in that terminal. The ARP request frame 48 is a frame broadcasted in the DC network 10 when the MAC address set as the communicated party is unknown.

The server 18a broadcasts the ARP request frame 48 in the DC network 10 to obtain an MAC address of, e.g., the server 18e to be communicated. The ARP request frame 48 transmitted from the server 18a is transferred to the access port 39a of the lower switch 22a.

The lower switch 22a transmits the received ARP request frame 48 via a predetermined port other than the access port 39a. At this time, the lower switch 22a refers to the broadcast table 42c shown in FIG. 6.

The lower switch 22a transmits the ARP request frame 48 via the network ports 38a and 38d which "accept" the transmission of the broadcast frame (a first step) while transmitting the ARP request frame 48 via the access ports 39b.

The ARP request frame 48 transmitted from the lower switch 22a is transferred to the upper switches 20a, 20b and the server 18b.

The upper switches 20a and 20b transfer the ARP request frame 48 to the lower switches 22b and 22c. At this time, the upper switches 20a and 20b distribute and transmit the ARP request frame 48 to the ports 28 belonging to the respective LAGs 26 by a frame transfer method appropriate for a link aggregation function.

For example, the upper switch 20a distributes and transmits the ARP request frame 48 to the ports 28d and 28g which respectively belong to the LAGs 26b and 26c. Meanwhile, the upper switch 20b distributes and transmits the ARP request frame 48 to the ports 28d and 28g which respectively belong to the LAGs 26e and 26f.

Here, when a combination of a source address contained in the ARP request frame 48, i.e., an MAC address of the server 18a, with the LAG 26 is not registered in the FDB 32a, the upper switches 20a and 20b register a combination of the MAC address of the server 18a contained in the ARP request frame 48 with the LAG 26 to the FDB 32a of the upper switches 20a and 20b per se (a second step).

The ARP request frames 48 transmitted from the upper switches 20a and 20b arrive the lower switches 22b and 22c.

When the ARP request frames 48 are received, the lower switches 22b and 22c refer to the broadcast table 42c shown in FIG. 6. In the broadcast tables 42c of the lower switches 22b and 22c, it is configured such that the reception of the broadcast frame is, e.g., "accepted" by the network ports 38a, 38b and 38c and is "refused" by the network ports 38d, 38e and 38f.

Accordingly, in the lower switches 22b and 22c, the ARP request frames 48 received by the network ports 38a, 38b and 38c which are configured to "accept" the reception of the broadcast frame are transmitted via the access ports 39a and 39b, not via the network ports 38 belonging to the LAG 46.

Meanwhile, the lower switches 22b and 22c refuse to receive the ARP request frames 48 transferred to the network ports 38d, 38e and 38f which are configured to "refuse" the reception of the broadcast frame. Therefore, the lower switches 22b and 22c discard the ARP request frames 48 transferred from the upper switch 20b.

The ARP request frames 48 transmitted from the lower switches 22b and 22c are transferred to the servers 18c, 18d, 18e and the repeater 18f.

Since the IP addresses of the servers 18c, 18d and the repeater 18f are different from the requested IP address, the received ARP request frames 48 are discarded thereat.

On the other hand, since the IP address of the server 18e matches the requested IP address, the server 18e informs the own MAC address to the server 18a (ARP reply).

Figure 8:
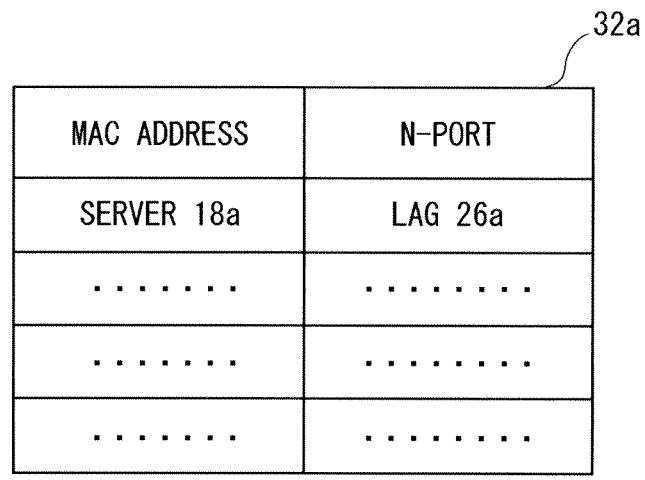
FIG. 8 is a table showing a content of an FDB of one of the upper switches which received an ARP request frame shown in FIG. 7.
Figure 9:
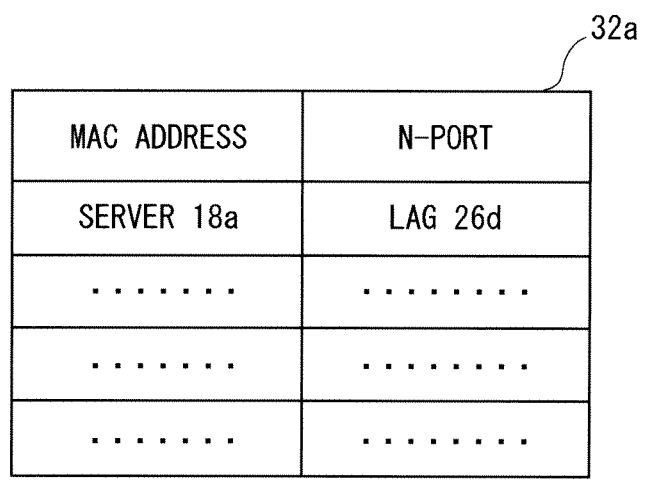
FIG. 9 is a table showing a content of an FDB of the other upper switch which received an ARP request frame shown in FIG. 7.

FIGS. 8 and 9 are tables showing the respective contents of the FDB 32a of the upper switches 20a and 20b after transferring the ARP request frames 48 as shown in FIG. 7.

In the "MAC address" section, a source address contained in the received frame is shown, and the port number of the port 28 which received the frame or identification information of the LAG 26 is shown in the "transfer port" section.

A combination of the source address contained in the ARP request frame 48 with the identification information of the LAG 26 to which the receiving port 28 belongs is registered in the FDB 32a of the upper switches 20a and 20b when each of the upper switches 20a and 20b receives the ARP request frame 48.

In detail, in the FDB 32a of the upper switch 20a shown in FIG. 8, the MAC address of the server 18a which has transmitted the ARP request frame 48 as well as the identification information of the LAG 26a to which the port 28a receiving the ARP request frame 48 belongs are registered so as to be associated with each other.

Meanwhile, a combination of the MAC address of the server 18a with identification information of the LAG 26d to which the port 28a receiving the ARP request frame 48 belongs is also registered in the FDB 32a of the upper switch 20b shown in FIG. 9 in the same manner as the upper switch 20a.

FIG. 10 is a schematic diagram showing a flow of the ARP request frame 48 when a link failure occurs in the DC network 10 shown in FIG. 7. Meanwhile, FIG. 11 is a table showing a content of the broadcast table 42c of the lower switch 22a after the network port 38 for transmitting the broadcast frame is switched over to another port in accordance with the occurrence of the link failure.

When the occurrence of failure in a physical link connected to the network port 38a (link down) is detected, the lower switch 22a switches over to another network port 38 from the network ports 38a to transmit the ARP request frame 48.

In detail, when the link down is detected by the link-down detection section 44b, the transmission setting section 44c updates the broadcast table 42c. The network port 38 for accepting transmission is changed in the broadcast transmission acceptance section by the transmission setting section 44c.

That is, the transmission setting section 44c reselects a network port 38 to accept transmission of the broadcast frame, from the network ports 38b and 38c in the sub-link 26 which includes the network ports 38a. The transmission setting section 44c selects a network port 38 to accept transmission, e.g., in ascending order of the port number. In other words, the port number is a priority order when switching over the network port 38.

As shown in FIG. 11, in the "broadcast transmission acceptance" section of the broadcast table 42c, the newly selected port number "#2" is set to "accept". Meanwhile, the port number "#1" in which the link-down occurred is set to "refuse" in the "broadcast transmission acceptance" section.

In case of referring to the broadcast table 42c in FIG. 11, when the server 18a transmits the ARP request frame 48, the lower switch 22a transmits the ARP request frame 48 received by the access port 39a via the network ports 38b and 38d belonging to the LAG 46a and via the access port 39b. The ARP request frames 48 transmitted from the network ports 38b, 38d and the access port 39b are transferred to the upper switches 20a and 20b and the server 18b.

The ARP request frames 48 transferred to the upper switches 20a and 20b are then transferred to the servers 18c, 18d and 18e and the repeater 18f via the lower switches 22b and 22c.

FIG. 12 is a schematic diagram showing a flow of the broadcast frame in the DC network 10 when a failure occurs in the upper switch 20 shown in FIG. 7.

When a transmission of electrical or optical signal from the upper switch 20a as a designated switch is lost, the partner switch fault detection section 44d of each of the lower switches 22 detects the failure of the upper switch 20a and informs to the reception setting section 44e.

The informed reception setting section 44e updates the broadcast table 42c. In detail, the network port 38 for accepting reception is changed in the broadcast reception acceptance section by the reception setting section 44e.

The reception setting section 44e allows the network ports 38d, 38e and 38f connected to the upper switch 20b to receive the broadcast frame. On the other hand, the reception setting section 44e configures the network ports 38a, 38b and 38c to refuse to receive the broadcast frame.

FIG. 13 is a table showing a content of the broadcast table 42c which is updated after the failure of the upper switch 20a is detected.

The numbers indicated in ascending order from "#1" to "#6" in the "port number" section respectively correspond to the network ports 38a, 38b, 38c, 38d, 38e and 38f.

In the "broadcast reception acceptance" section, "#1, #2 and #3" are set to "refuse" while "#4, #5 and #6" are set to "accept".

Meanwhile, in the "broadcast transmission acceptance" section, "#4" is set to "accept" and the other port numbers "#1, #2, #3, #5 and #6" are set to "refuse".

As shown in FIG. 13, changing the network port 38 for receiving the broadcast frame by the reception setting section 44e is equivalent to changing the designated switch. The changing order of the designated switch can be, e.g., preliminary determined.

Meanwhile, even if the lower switch 22 transmits the frame via the network ports 38a, 38b and 38c, the failed upper switch 20a cannot receive the frame. Accordingly, the transmission setting section 44c of the lower switch 22 may configure all of the network ports 38a, 38b and 38c connected to the upper switch 20a to refuse transmission of the broadcast frame as shown in FIG. 13.

Referring again to FIG. 12, when the server 18a transmits the ARP request frame 48 after the occurrence of failure in the upper switch 20a and the update of the broadcast table 42c by the reception setting section 44e, the lower switch 22a transmits the ARP request frame 48 via the network port 38d belonging to the LAG 46a and via the access port 39b.

The ARP request frames 48 transmitted from the network port 38d and the access port 39b are transferred to the upper switch 20b and the server 18b in each of which a failure does not occur.

Then, the ARP request frames 48 transferred to the upper switch 20b is transferred to the servers 18c, 18d and 18e and the repeater 18f via the lower switches 22b and 22c.

In the DC network 10 of the embodiment, the lower switch 22 distributes and transmits the unicast frame received by the access ports 39a or 39b to the network port 38 belonging to the LAG 46. Accordingly, the frame is transferred between the lower switches 22 via plural upper switches 20 and is prevented from concentrating in one upper switch 20. As a result, load on each upper switch 20 due to frame transfer is shared and communication band of each upper switch 20 is effectively utilized.

In the DC network 10 of the embodiment, the lower switch 22 transfers the ARP request frame 48 to all of the upper switches 20 even if the network ports 38 belong to the LAG 46. This allows the source address contained in the ARP request frame 48 to be registered in the FDB 32a in all of the upper switches 20.

In the DC network 10 of the embodiment, the lower switch 22 is configured to accept reception of only the broadcast frame from one upper switch 20. This prevents the large amount of broadcast frame from flowing in the DC network 10, thereby preventing pressure on the communication band caused by transmission and reception of the broadcast frame. Even though, for example, a virtual server is live-migrated between the servers 18, a large amount of the ARP request frame 48 does not flow.

In the DC network 10 of the embodiment, even if transmission of the broadcast frame through the link connected to the network port 38a is failed, the lower switch 22 newly switches over to the network port 38b in the same sub-link 26 and transmits the broadcast frame.

That is, in the lower switch 22, in case that the transmission of the broadcast frame through a physical link is failed, the broadcast transmission setting is set to transmit the broadcast frame through another physical link belonging to the same sub-link 26 as the failed physical link.

Therefore, the lower switch 22 can certainly transmit the broadcast frame to all of the connected upper switches 20 while distributing and transferring the unicast frame received by the access ports 39a or 39b to the network port 38 belonging to the LAG 46.

In the DC network 10 of the embodiment, when a failure occurs in the upper switch 20 as a designated switch, the lower switch 22 accepts to receive the broadcast frame from another upper switch 20. In other words, when a failure occurs in the designated switch, a new designated switch is selected from the upper switches 20. Therefore, the ARP request frame 48 is certainly transferred to the servers 18.

Meanwhile, the invention is not limited to the embodiment and various modifications may be made.

For example, in the embodiment, although a port which accepts reception of the broadcast frame is provided in the lower switch 22, a port which accepts transmission of the broadcast frame may be provided in the upper switch 20. That is, it is only necessary to configure such that the lower switch 22 receives only the broadcast frame relayed by one upper switch 20.

Although the method of transferring the broadcast frame has been explained using the ARP request frame 48 as an example in the embodiment, an RARP (reverse ARP) request frame which is also a broadcast frame is also transferred from the lower switch 22 to all of the upper switches 20.

In the embodiment, the upper switch group 15 and the lower switch group 16 may partially include a chassis-type switching hub having plural line cards.

Although the server 18 is connected to the access port 39 in the embodiment, another external device such as, e.g., external storage device, etc., may be connected. That is, the DC network 10 is applicable to CEE (converged enhanced Ethernet, "Ethernet" is a registered trademark) including an external storage device.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A network system, comprising:
a plurality of lower switches;
a plurality of upper switches; and
a link group for interconnecting the plurality of lower switches to the plurality of upper switches in a multipoint-to-multipoint relationship,
wherein the link group comprises a sub-link for interconnecting the plurality of lower switches to the plurality of upper switches in a point-to-point relationship as one logical link and a main link for interconnecting the plurality of lower switches to the plurality of upper switches in a point-to-multipoint relationship as one logical link,
wherein the plurality of lower switches are each set to conduct a broadcast transmission such that a broadcast frame with a broadcast address set as a destination is transmitted to the plurality of upper switches through the sub-link that is available for communication and connected to the plurality of lower switches,
wherein the plurality of upper switches each receive the broadcast frame and register a source address contained in the broadcast frame into a forwarding database (FDB) of the plurality of upper switches,
wherein said each of lower switches comprises:
a plurality of first ports, each of the first ports being connected to one of the plurality of upper switches; and
a second port different from the first ports,
wherein, when said each of the lower switches receives the broadcast frame at the second port, the broadcast frame is transmitted to the plurality of upper switches,
wherein the broadcast frame is transmitted to all of the plurality of upper switches through all sub-links that are available for communication and are connected to said each of the plurality of lower switches,
wherein a first port of the plurality of first ports belongs to a link aggregation group (LAG), and
wherein, for transferring a unicast frame that a destination address is set to be a specific MAC address, a frame transfer unit transfers the unicast frame by reference to the FDB and an LAG table.

2. The network system according to claim 1, wherein the broadcast transmission is set such that the plurality of lower switches each transmit the broadcast frame through one physical link per each of the sub-link when the sub-link comprises two or more physical links.

3. The network system according to claim 2, wherein, when the broadcast frame through the one physical link is not transmitted, the broadcast transmission is set such that the plurality of lower switches each transmit the broadcast frame through another physical link belonging to the same sub-link as the one physical link.

4. The network system according to claim 1, wherein a broadcast reception is set such that the plurality of lower switches each receive only a broadcast frame relayed by one designated switch selected from the plurality of upper switches.

5. The network system according to claim 4, wherein, when the designated switch has a malfunction, a new designated switch is selected from the plurality of upper switches.

6. The network system according to claim 4, wherein the broadcast reception is set such that the plurality of lower switches each refuse reception of a broadcast frame relayed by the plurality of upper switches except the designated switch.

7. The network system according to claim 1, wherein the broadcast frame comprises an address resolution protocol (ARP) request frame or a reverse ARP (RARP) request frame.

8. The network system according to claim 1, wherein the broadcast frame is transmitted to all of the plurality of upper switches through all sub-links that are available for communication and are connected to the lower switches which conduct the broadcast transmission.

9. The network system according to claim 1, wherein, when said each of the lower switches receives the broadcast frame, said each of the lower switches transmits the broadcast frame through all sub-links that are available for communication and are connected to said each of the plurality of lower switches.

10. A method of operating a network system that comprises a plurality of lower switches, a plurality of upper switches, and a link group for interconnecting the plurality of lower switches to the plurality of upper switches in a multipoint-to-multipoint relationship, the link group comprising a sub-link for interconnecting the plurality of lower switches to the plurality of upper switches in a point-to-point relationship as one logical link and a main link for interconnecting the plurality of lower switches to the plurality of upper switches in a point-to-multipoint relationship as one logical link, said method comprising:

transmitting a broadcast frame with a broadcast address set as a destination from each of the plurality of lower switches to the plurality of upper switches through the sub-link that is available for communication and connected to the plurality of lower switches; and receiving the broadcast frame by each of the plurality of upper switches and registering a source address contained in the broadcast frame into a forwarding database (FDB) of each of the plurality of upper switches, wherein said each of lower switches comprises:

a plurality of first ports, each of the first ports being connected to one of the plurality of upper switches; and a second port different from the first ports, wherein, when said each of the lower switches receives the broadcast frame at the second port, the broadcast frame is transmitted to the plurality of upper switches, wherein the broadcast frame is transmitted to all of the plurality of upper switches through all sub-links that are available for communication and are connected to said each of the plurality of lower switches, wherein a first port of the plurality of first ports belongs to a link aggregation group (LAG) and wherein, for transferring a unicast frame that a destination address is set to be a specific MAC address, the unicast frame is transferred by reference to the FDB and an LAG table.

11. The method according to claim 10, wherein the broadcast frame is transmitted to all of the plurality of upper switches through all sub-links that are available for communication and are connected to the lower switches which conduct the broadcast transmission.

12. The method according to claim 10, wherein, when said each of the lower switches receives the broadcast frame, said each of the plurality of the lower switches transmits the broadcast frame through all sub-links that are available for communication and are connected to said each of the plurality of lower switches.

* * * * *